(12) United States Patent
Robinson

(10) Patent No.: US 10,259,525 B2
(45) Date of Patent: Apr. 16, 2019

(54) CYCLING AID

(71) Applicant: Alan John Robinson, Plymouth Devon (GB)

(72) Inventor: Alan John Robinson, Plymouth Devon (GB)

( * ) Notice: Subject to any disclaimer, the term of this patent is extended or adjusted under 35 U.S.C. 154(b) by 0 days.

(21) Appl. No.: 14/916,138

(22) PCT Filed: Feb. 10, 2015

(86) PCT No.: PCT/EP2015/052699
§ 371 (c)(1),
(2) Date: Mar. 2, 2016

(87) PCT Pub. No.: WO2015/128182
PCT Pub. Date: Sep. 3, 2015

(65) Prior Publication Data
US 2016/0355232 A1 Dec. 8, 2016

(30) Foreign Application Priority Data

Feb. 28, 2014 (GB) .................................. 1403591.9

(51) Int. Cl.
*B62M 3/02* (2006.01)
*B62M 3/04* (2006.01)

(52) U.S. Cl.
CPC ................ *B62M 3/04* (2013.01); *B62M 3/02* (2013.01)

(58) Field of Classification Search
CPC . B62M 3/00; B62M 3/02; B62M 3/04; B62M 3/06; B62M 2003/006; A63B 2022/0611; A63B 2022/0623; A63B 2022/0629
See application file for complete search history.

(56) References Cited

U.S. PATENT DOCUMENTS

| | | | |
|---|---|---|---|
| 4,446,754 A | 5/1984 | Chattin | |
| 4,872,695 A * | 10/1989 | Silvano | B62M 3/04 280/257 |
| 5,566,590 A * | 10/1996 | Wan | B62M 3/04 74/32 |
| 5,879,017 A * | 3/1999 | Debruin | B62M 1/36 280/259 |
| 6,487,933 B2 * | 12/2002 | Orioli | B62M 3/04 74/594.1 |
| 6,802,798 B1 * | 10/2004 | Zeng | A63B 22/0015 482/57 |

(Continued)

FOREIGN PATENT DOCUMENTS

| | | | |
|---|---|---|---|
| ES | 2061367 | 1/1994 | |
| FR | 2724361 A1 * | 3/1996 | .............. B62M 3/04 |

(Continued)

OTHER PUBLICATIONS

Machine translation of DE 20316917 U obtained on Apr. 5, 2017.*

(Continued)

*Primary Examiner* — Adam D Rogers
(74) *Attorney, Agent, or Firm* — Nicholas J. Landau; Bradley Arant Boult Cummings LLP

(57) ABSTRACT

A crank arm for a bicycle chainset is provided. The arm comprises means for varying crank length during rotation, whereby to gain mechanical advantage.

9 Claims, 13 Drawing Sheets

(56) References Cited

U.S. PATENT DOCUMENTS

| | | | | |
|---|---|---|---|---|
| 6,840,136 | B1* | 1/2005 | Jones | B62M 1/36 280/259 |
| 7,350,796 | B2* | 4/2008 | Misevski | B62M 1/36 280/259 |
| 8,146,938 | B2* | 4/2012 | Gobillard | B62M 1/36 280/259 |
| 8,328,216 | B2* | 12/2012 | Lee | B62M 3/04 280/259 |
| 8,864,628 | B2* | 10/2014 | Boyette | A63B 24/0087 482/1 |
| 2005/0050987 | A1* | 3/2005 | Brandt | B62M 3/04 74/594.3 |
| 2011/0121536 | A1 | 5/2011 | Lee | |
| 2012/0167709 | A1 | 7/2012 | Chen | |

FOREIGN PATENT DOCUMENTS

| | | | | |
|---|---|---|---|---|
| FR | 2743541 A1 * | 7/1997 | | B62M 3/04 |
| GB | 2428412 | 1/2007 | | |
| GB | 2456086 | 7/2009 | | |
| GB | 2512204 | 2/2015 | | |
| JP | 2001-294188 | 10/2001 | | |
| LU | 91828 | 12/2012 | | |
| LU | 91859 | 3/2013 | | |
| WO | WO 0026080 A1 * | 5/2000 | | B62M 3/04 |
| WO | WO 0051880 A1 * | 9/2000 | | B62M 3/04 |

OTHER PUBLICATIONS

Machine translation of LU 91859 A2 obtained on Apr. 5, 2017.*
Machine translation of LU 91828 A2 obtained on Apr. 5, 2017.*
Certified translation of LU 91859 A1 obtained on Jun. 26, 2018. (Year: 2018).*
Van Prooijen, Tom "International Search Report and Written Opinion—International Application No. PCT/EP2015/052699" European Patent Office; dated May 28, 2015; pp. 1-11.
Osman, Philip "Combined Search and Examination Report—Great Britain application No. GB1403591.9" United Kingdom Intellectual Property Office; dated Mar. 24, 2014; pp. 1-.

* cited by examiner

CYCLING AID

CROSS-REFERENCE TO RELATED APPLICATIONS

This application is a national stage under 35 U.S.C. 371 of International Application PCT/EP2015/052699, filed on Feb. 10, 2015 (currently published). International Application no. PCT/EP2015/052699 cites the priority of Great Britain patent application no. 1403591.9, filed Feb. 28, 2014, issued as Great Britain patent number GB2512204, on Jan. 27, 2015.

BACKGROUND

This invention relates to a means and method of improving and enhancing the efficiency and effectiveness of the current and present system of utilising the benefits of MA (Mechanical Advantage) during the process of transferring the input energy force applied by a cyclist to the chain set mechanism of a bicycle in order to obtain motive force to the bicycle.

Bicycles provide a proven form of self-propelled transportation and the principle of incorporating the benefits of MA into the chain set mechanism has been used for many years.

However, with the current method of utilising the benefits gained from MA when it is applied to the Pedal Lever Combination (PLC) length, and rotating around a fixed fulcrum point within the bicycle chain set mechanism, there are limits and restriction to increase the length of the PLC.

These restrictions and limits to the length of the PLC are simply because of the need and necessity of ground clearance for the PLC during the rotating actions (pedaling) of the chain set mechanism and the further problem concerning the average leg length of the cyclist and their ability to reach and transfer their energy force as easily as possible if the PLC is too long, and out of their reach. This invention provides the means, method and actions to increase the length of the PLC during the rotation period of the chain set when the present restrictions and limits are overcome and non-applicable.

It is known to produce bicycle cranks with various fixed lengths to accommodate different sized riders and different types of cycling. Crank length is measured from the centre of the pedal spindle to the centre of the bottom bracket spindle or axle. It is also known to make bicycle cranks that can be adjusted to different fixed lengths.

SUMMARY

The present invention seeks to provide improvements in or relating to bicycle chainsets.

According to an aspect of the present invention there is provided a crank arm for a bicycle chainset, the arm comprising means for varying crank length during rotation whereby to gain mechanical advantage.

A further aspect provides a bicycle chainset crank arm for providing an in-rotation varying crank length, said crank length extending after the rotation passes top dead centre and retracting prior to bottom dead centre.

The arm may comprise two or more sections movable relative to each other to cause the variation in length. The sections may be slidably movable with respect to each other.

The arm may comprise means for attracting and/or repelling the sections to/from each other, for example using magnetic forces. In some embodiments electromagnets are used.

The present invention also provides a bicycle chainset comprising a crank arm as described herein.

The present invention also provides a bicycle comprising a crank arm or chainset as described herein.

The present invention also provides a PLC (Pedal Lever Combination) system for a bicycle, in which the PLC is constructed in two separate sections.

There may be provided an electromagnetic force to repel the two sections apart during the rotation of the bicycle chain set mechanism, and at times when the length of the PLC overcomes the present limitations and restrictions within the current system.

There may be provided an electromagnetic force to attract two sections to reconnect.

Electronic actions may be activated wirelessly, for example electronic actions are activated by Wi-Fi and/or Hi-Fi signals.

There may be provided a battery source for EMF (electro motive force) and a switch on/off in a position on the bicycle to allow easy use by the cyclist.

In some embodiments the chainset mechanism/system is permanently activated. In other embodiments it is possible to activate/deactivate the system.

In some embodiments the system is user activatable. For example a push-button may be provided on handlebars to allow activation of the MA improver.

The arm may be extended/retracted using a change in polarity and/or creation of polarity in either or both of a pair of opposing magnets (for example electromagnets), using the well-known effect to cause attraction/repulsion depending on the respective polarities of a pair of magnets.

To determine where the pedal set is in its rotation path and/or to cause extension/retraction of the arm in use depending on the rotation extent, a signalling system may be employed which may be computer controlled.

DETAILED DESCRIPTION

Figure 1:
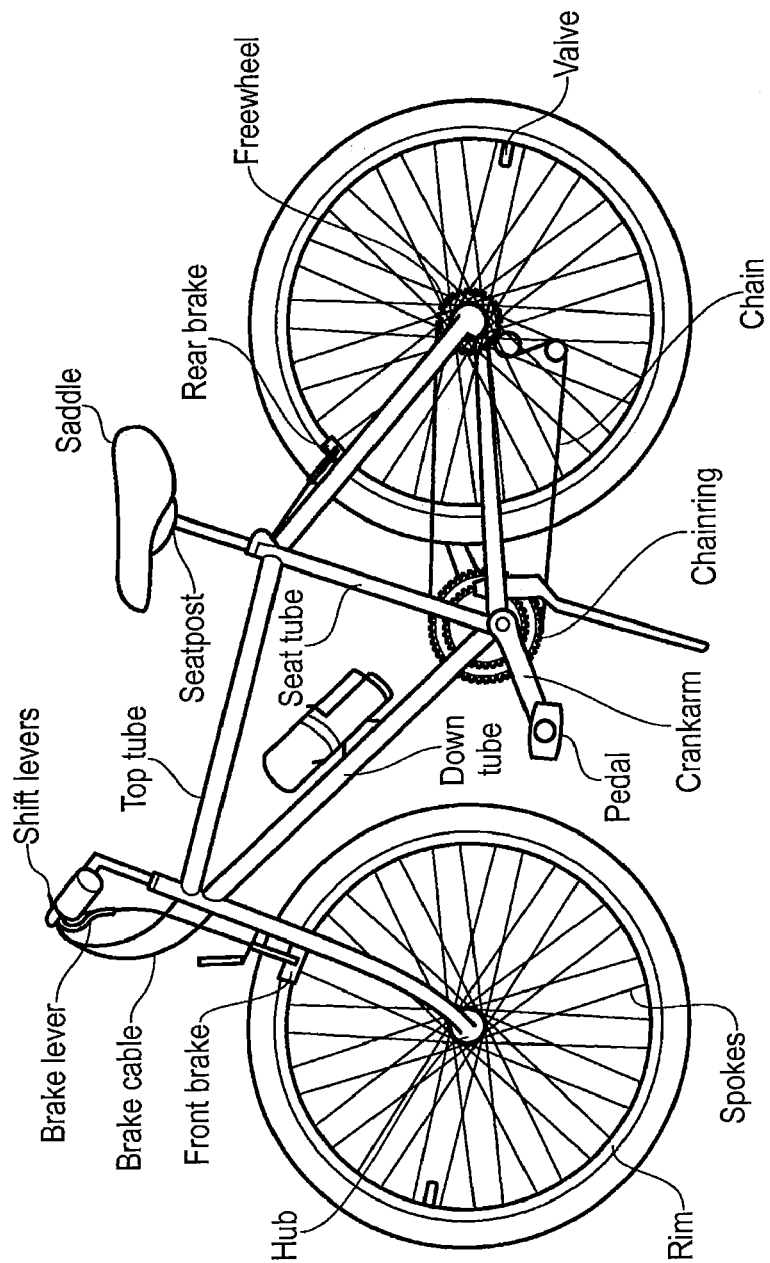
FIG. 1 shows a conventional bicycle as known in the art.

Aspect and embodiments of the present invention may be configures to be retrofittable to existing bicycles.

In one method of providing an electromagnetic force to extend the length of the PLC, it is within the scope and range of this intervention to use sources of power and mechanical means to extend the length of the PLC, such as mechanically, electrically, physically and hydraulically. However, in this preferred method the PLC is constructed in two separate sections, the upper section and the lower section. An electromagnetic force is applied to the upper and lower sections which repel the two sections apart thus gaining PLC extension and the PLC is increased in length, and an electromagnetic force is applied to the two PLC sections which attract the two sections together. Both these electromagnetic forces are activated by Wi-Fi and/or a wire signal connected to the electromagnetic forces within the two sections of the PLC.

In some embodiments the arm is resiliently biased to an extended position and is movable to a contracted position. In other embodiments the arm is resiliently biased to a contracted position and is movable to an extended position.

In some embodiments springs or the like may be used.

A further aspect of the present invention provides a crank arm for a bicycle chainset, the arm comprising means for varying crank length during rotation whereby to gain mechanical advantage, in which the arm comprises two or more sections movable relative to each other to cause the variation in length, and in which the arm comprises means for attracting and/or repelling the sections to/from each other.

A further aspect of the present invention provides a bicycle chainset crank arm for providing an in-rotation varying crank length, said crank length extending after the rotation passes top dead centre and retracting prior to bottom dead centre, in which the arm comprises two or more sections movable relative to each other to cause the variation in length, and in which the arm comprises means for attracting and/or repelling the sections to/from each other.

Different aspects and embodiments of the invention may be used separately or together.

Further particular and preferred aspects of the present invention are set out in the accompanying independent and dependent claims. Features of the dependent claims may be combined with the features of the independent claims as appropriate, and in combination other than those explicitly set out in the claims.

The present invention will now be more particularly described, with reference to the accompanying drawings.

Example embodiments are described below in sufficient detail to enable those of ordinary skill in the art to embody and implement the systems and processes herein described. It is important to understand that embodiments can be provided in many alternate forms and should not be construed as limited to the examples set forth herein.

Accordingly, while embodiments can be modified in various ways and take on various alternative forms, specific embodiments thereof are shown in the drawings and described in detail below as examples. There is no intent to limit to the particular forms disclosed. On the contrary, all modifications, equivalents, and alternatives falling within the scope of the appended claims should be included. Elements of the example embodiments are consistently denoted by the same reference numerals throughout the drawings and detailed description where appropriate.

The terminology used herein to describe embodiments is not intended to limit the scope. The articles "a," "an," and "the" are singular in that they have a single referent, however the use of the singular form in the present document should not preclude the presence of more than one referent. In other words, elements referred to in the singular can number one or more, unless the context clearly indicates otherwise. It will be further understood that the terms "comprises," "comprising," "includes," and/or "including," when used herein, specify the presence of stated features, items, steps, operations, elements, and/or components, but do not preclude the presence or addition of one or more other features, items, steps, operations, elements, components, and/or groups thereof. Unless otherwise defined, all terms (including technical and scientific terms) used herein are to be interpreted as is customary in the art. It will be further understood that terms in common usage should also be interpreted as is customary in the relevant art and not in an idealized or overly formal sense unless expressly so defined herein.

In FIG. 1 a conventional bicycle is shown to aid with an understanding of the present invention and how it forms part of the drivetrain.

The drivetrain starts with the pedals, which is where the power source (the rider) meets the locomotive mechanism. The pedals are held in place by the cranks, which are strong bars that jut out of the chainwheel. The chainwheel is the set of circular gears, or sprockets (on the right side of the frame).

At its centre, called the crank spindle, the chainwheel connects to the bottom bracket of the bike and turns by means of ball bearings. The chain runs around the sprockets of the chainwheel and connects around the back wheels axle at the freewheel, or cassette, which has sprockets of its own, called cogs.

The freewheel, or cassette, attaches to the back wheels's hub, turning the back wheel whenever the chain moves; which in turn makes the bike move.

The chainset (also known as a crankset) is the part of a bike's drivetrain that takes the pedaling power from a rider's legs and uses it to drive the chain and in turn, to rotate the rear wheel. The crankset is composed of a chainring and crankarms on which the pedals are mounted. The crankset is mounted on the bike frame's bottom bracket. It is connected to the rider by the pedals, to the bicycle frame by the bottom bracket, and to the rear sprocket, cassette or freewheel via the chain.

The two cranks, one on each side and usually mounted 180.degree. apart, connect the bottom bracket axle to the pedals.

There now follows a description of the forces acting on the front chainset (by which is meant the pedal, lever and sprocket with which the cyclist moves the drive chain). A discussion of the properties of levers, with reference to mechanical advantage and energy used will follow. Then the effect of increasing the length of the pedal lever on the performance of a front chain set will also be described.

Forces Acting on the Front Chain Set

As the cyclist turns the front sprocket on a bicycle, he applies a force to the descending pedal. For simplicity, I have assumed that the force applied by the cyclist to the pedal acts directly downwards.

The analysis is similar in principle if force applied to the pedal is not directly downwards.

Energy is expended when a force moves an object through distance. The cyclist expends energy, or does work, by applying a force in the direction of movement of the pedal. The pedal follows a circular path. The force which moves the pedal around its circular path acts at a tangent to the circular path, and is called the tangential force (Ft in FIG. 3).

Figure 2:
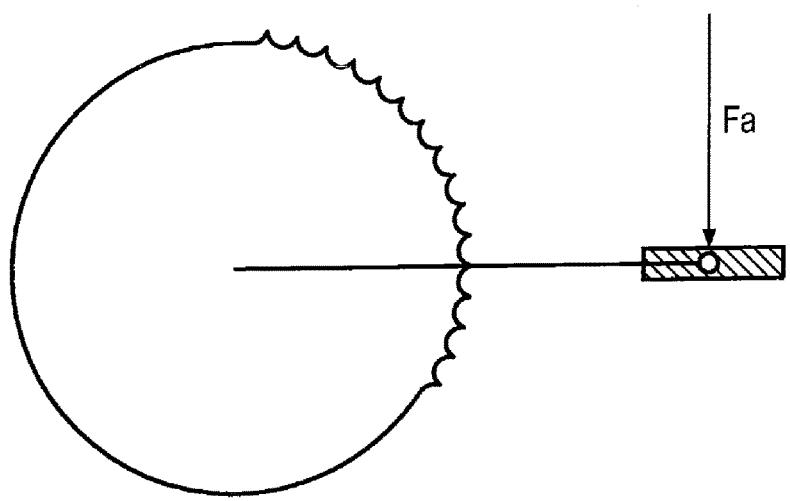
FIG. 2 shows the force acting on the pedal in the horizontal position.

The force applied by the cyclist to the pedal, (Fa in FIG. 3), is vertical and the only time during which the movement of the pedal is vertical is when the pedal lever is horizontal (FIG. 2). In this condition, the applied force is equal to the tangential force, Ft.

Figure 3:
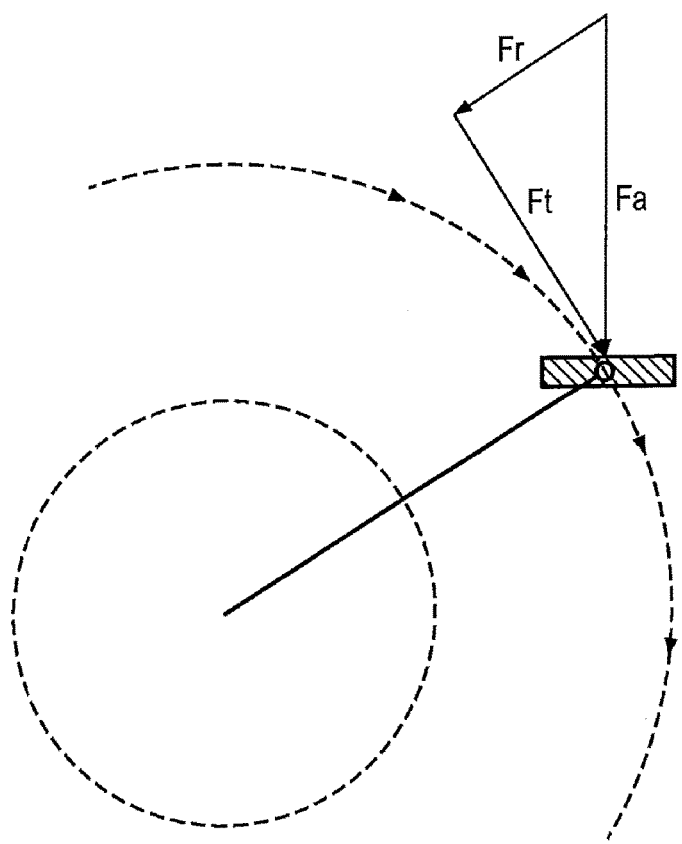
FIG. 3 shows the forces acting on the pedal when it is in non-horizontal position.

At all times Fa, the force applied to the pedal, must be considered in two components (FIG. 3).

The tangential component, Ft, acts to turn the sprocket.
[0049] The radical component, Fr, acts along the lever.

Figure 4:
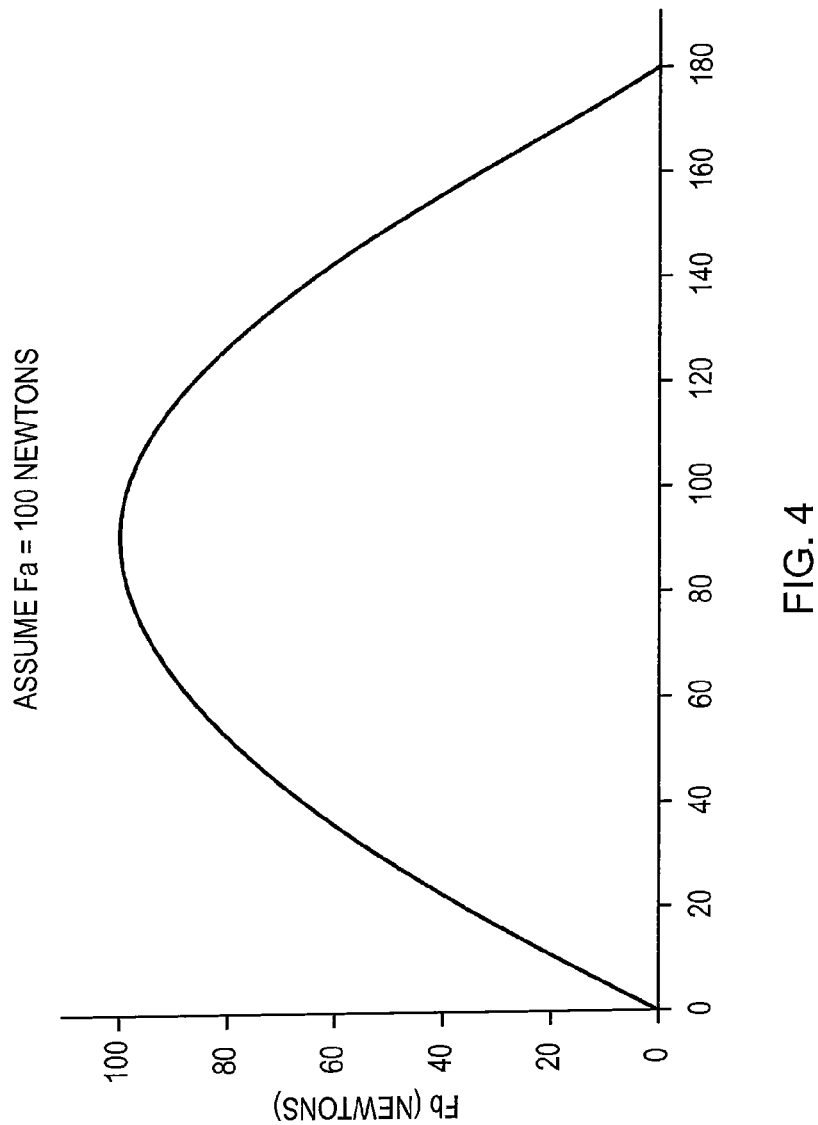
FIG. 4 shows the variation of tangential force on the pedal throughout one rotation, with constant vertical force.

If a constant vertical force is applied to the pedal, the tangential force acting to turn the sprocket varies as the pedal descents (FIG. 4).

Is it possible to use an extending lever to increase the performance of the cyclist?

Figure 5:
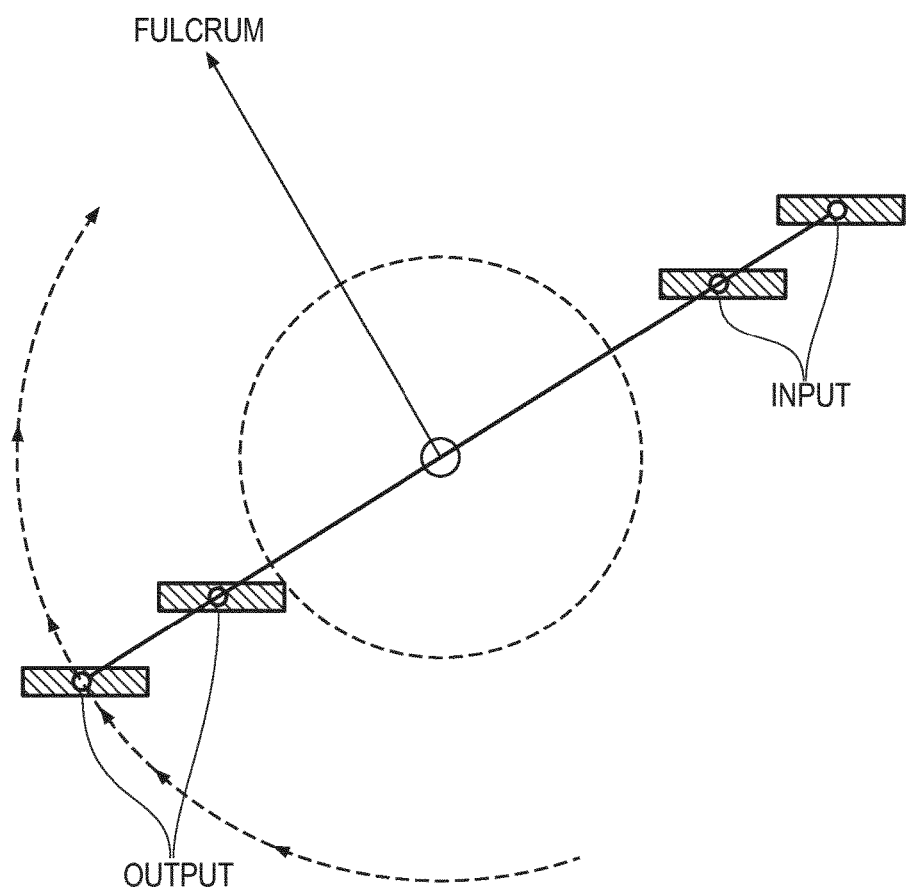
FIG. 5 shows the theoretical pedal positions in relation to the centre of rotation.
Figure 6:
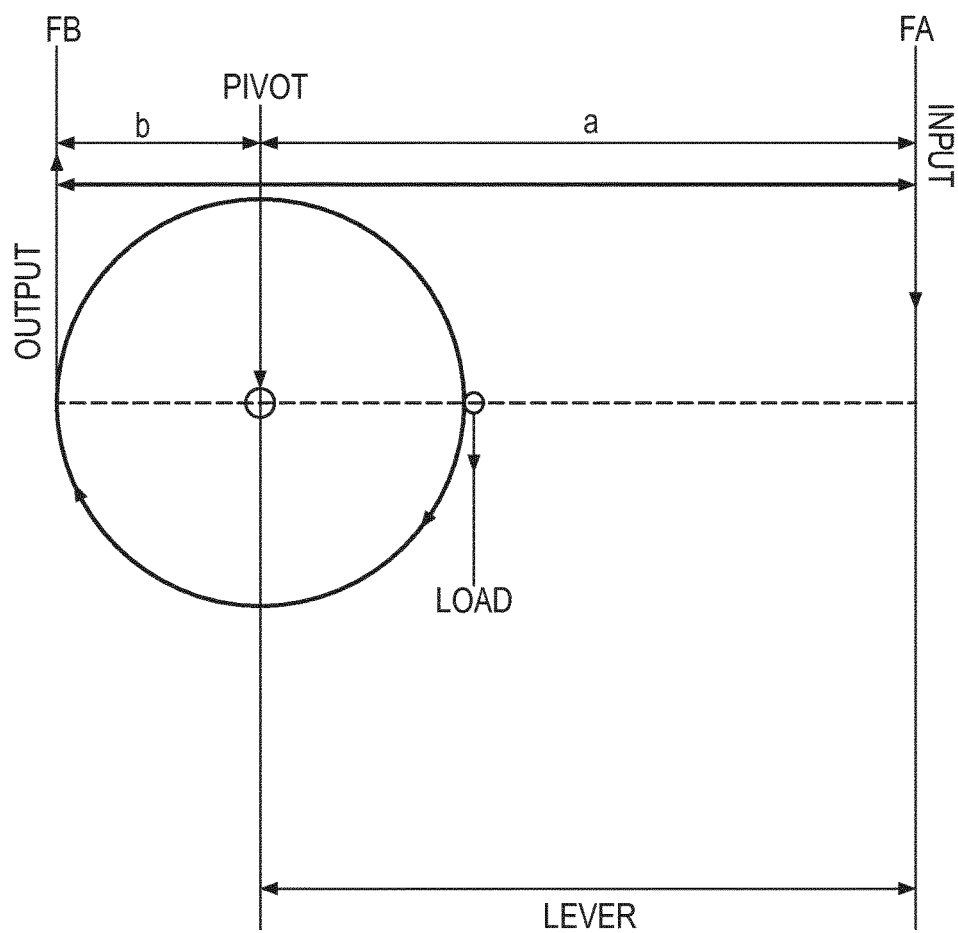
FIG. 6 shows the relationship between input load and lever length on the output force.
Figure 7:
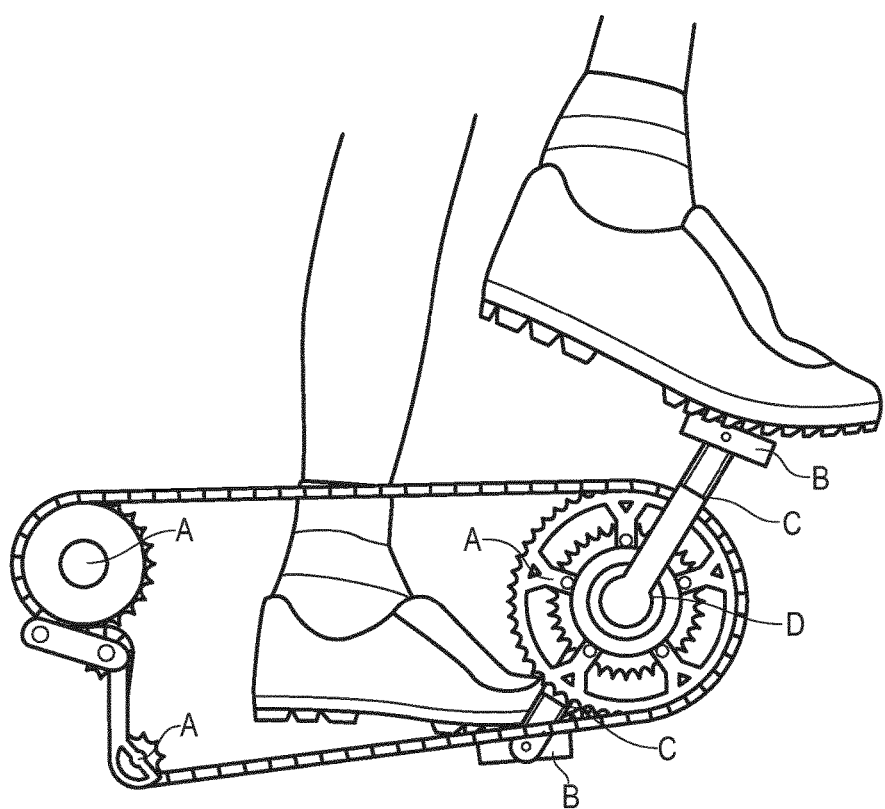
FIG. 7 shows the bicycle chainset mechanism.
Figure 8:
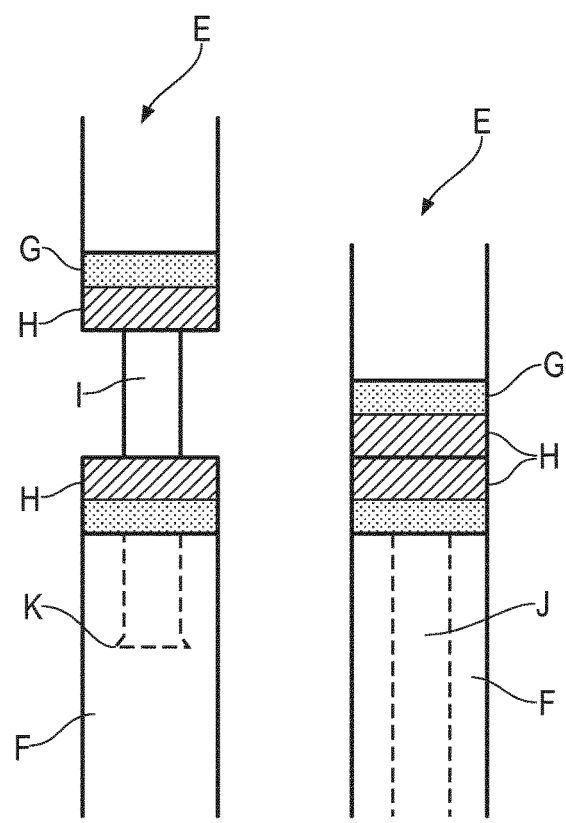
FIG. 8 shows the extension mechanism of the PLC.
Figure 9:
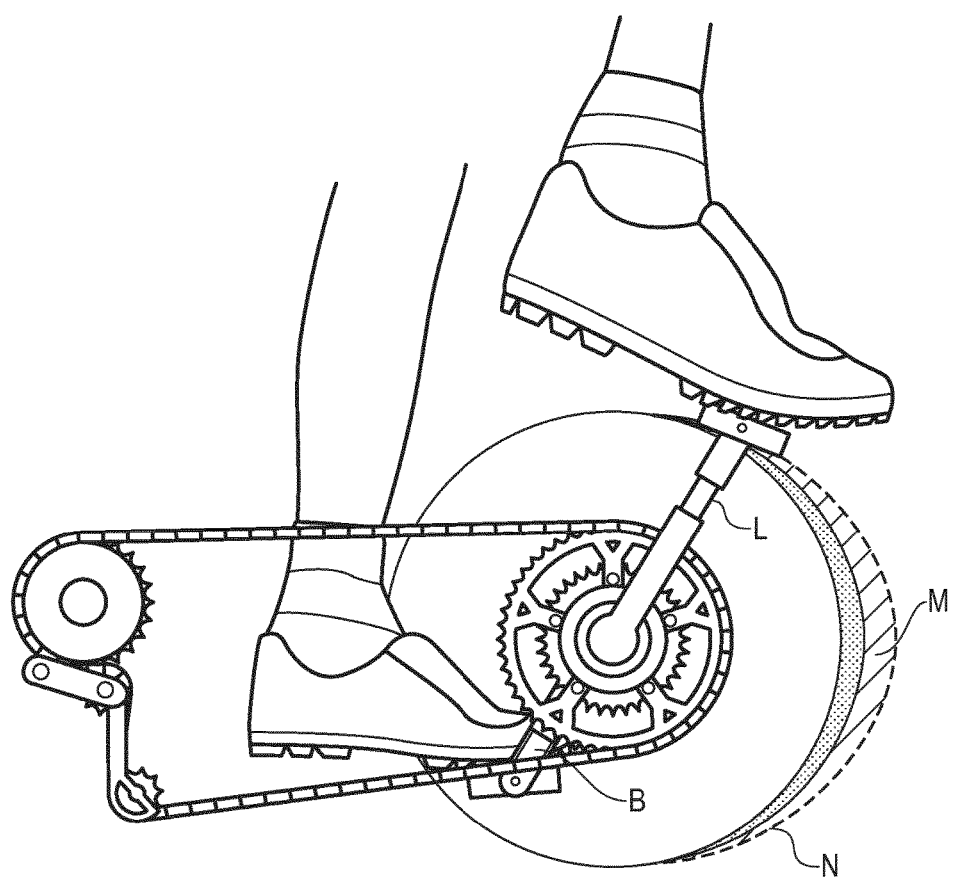
FIG. 9 shows the chainset mechanism with effective area of PLC extension.
Figure 10:
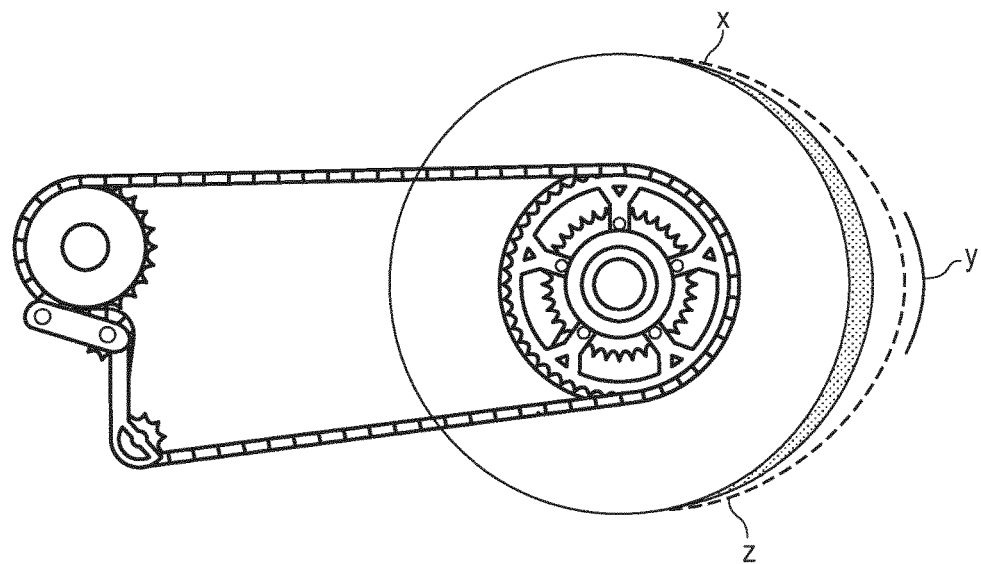
FIG. 10 shows the chainset mechanism with optimum area of PLC extension.
Figure 11:
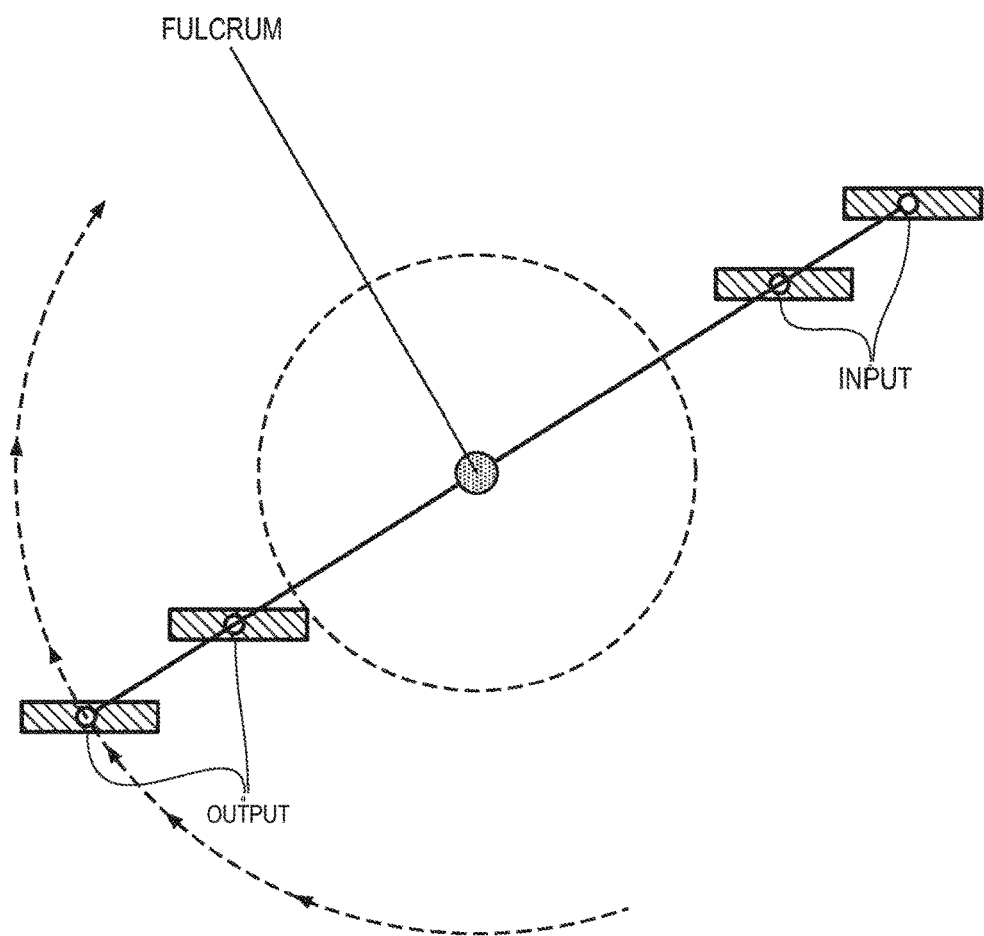
FIG. 11 shows the theoretical pedal positions in relation to the centre of rotation.

A lever can be used to provide a mechanical advantage. FIG. 5 shows an imaginary mass-lever with a mechanical advantage of 4, which is used to exert a force (on a load) which is four times greater than the force exerted through the effort of the cyclist on the other end of the lever.

The load end of the lever moves through 1 M, the effort end of the lever moves through 4 M. assuming that the system has no frictional losses, the energy expended by the cyclist through pushing down with a force of 100 Newtons through 4 m is the same as the energy expended raising the 400 Newton load through 1 m. for a frictionless lever, energy out is equal to energy in. (With friction, the useful energy out is slightly less than the energy in).

The force required is reduced by a factor of four, but the distance moved is increased by the same factor.

I calculate the energy in as

Energy in (Joules)=Force (Newtons)×distance moved (meters)

Energy in=100 N×4 Nm=400 Joules

Similarly,

Energy in (Joules)=Force (Newtons)×distance moved (meters)

Energy out=400 N×1 m=400 Nm=400 Joules

Energy in=energy out=400 Joules

Bicycle Chain Sets

For a bicycle with longer lever, or with extending levers, the cyclist finds pushing the pedals easier.

However, the distance through which the pedal must be pushed is also longer.

Mechanical Advantage

There is shown a front chain set with a 150 mm diameter front sprocket, and pedal levers with a length of 150 mm. when the pedal lever is horizontal, a force of 150 Newtons applied to the pedal with bring about tensile force of 300 Newtons in the chain. With the pedal lever horizontal, the mechanical advantage of this front chain set is 2.

Also show is a front chain set with a 150 mm diameter front sprocket, and pedal levers with a length of 225 mm. when the pedal lever is horizontal, a force of 100 Newtons applied to the pedal with bring about a tensile force of 300 Newtons in the chain. With the pedal lever horizontal, the mechanical advantage of this front chain set is 3.

With the pedals in the horizontal position the mechanical advantage of the 150 mm and 225 mm lever chain are set in the ration 2 to 3. To generate an equivalent force in the chain, the force required to turn the 225 mm lever are in the 3 to 2.

Distance Traveled

During the descending stroke, the pedal on the end of the 150 mm lever moves through 471 mm in the direction of the tangential force, that is it describes a semi-circular arc with radius 150 mm. during the descending stroke, the pedal on the end of the 225 mm lever moves through 706 mm in the direction of the tangential force.

The distance moved by the pedal on the 150 mm lever, and the distance moved by the pedal on the 225 mm lever are in the ratio of 2 to 3.

Energy Used by the Cyclist

The energy used by the cyclist can be calculated as

Energy (Joules)=Force (Newtons)×distance moved (meters)

To summarise:

| Length of lever on pedal | Relative applied force | Relative distance moved by pedal in descending stroke | Relative energy used by cyclist (force × distance) |
|---|---|---|---|
| 150 mm | 3 | 2 | 6 |
| 225 mm | 2 | 3 | 6 |

Conclusion

Lengthening the levers on the pedals brings about no reduction in the energy required to move the bicycle. The cyclist does find moving the pedal easier if the lever is longer, but he has to move the pedal on the longer lever over a greater distance, so he uses the same amount of energy.

For levers with a variable length, as the lever extends, so the force required to move the lever is reduced, and the distance through which the lever must be moved increases proportionately. The energy used in operating the lever remains unchanged.

However, there is one new beneficial factor within this particular adaption of obtaining MA by lengthening the pedal lever of a bicycle. It is the more favourable and efficient position of the cyclist when the "pushing forward" action with the legs is applied easier than the "downward" action. This completely negates an increased expansion of energy by the cyclist over the extra distance covered.

In FIG. 5 the formula and general principles behind the present invention are shown.

Referring to FIGS. 6 to 11:

A shows the chain set mechanism of a bicycle.

B shows the foot pedal mechanism.

C shows the current and fixed pedal lever combination (PLC).

D shows the MA fulcrum axis point of the PLC in a bicycle.

E shows the upper section of the two part PLC.

Figure F shows the lower section of the two part PLC.

G shows the Wi-Fi or wire connecting signal receiver and transmitter to and from the electromagnetic plates.

H shows the electromagnetic plates.

I shows the sliding arm bar that connects the two sections of PLC.

J shows the cavity chamber to receive the sliding arm bar when the two PLC are connected.

K shows the limiting flanges of the sliding arm bar to limit PLC extension.

L shows the initial increase in PLC length.

M shows the area of extension available.

N shows the start of the PLC retraction.

X shows the starting area of PLC extension.

Y shows the optimum area of PLC extension.

Z shows the area of PLC retraction.

As the rider pedals near the top-dead-centre position of the pedal stroke the crank length is increased.

This shows the formula of MA to obtain benefits from a lever-axis point fulcrum end power input.

The embodiment provides automatic extension of crank length to maximise MA and also retraction of crank length so that the pedal does not hit the ground. In this embodiment the crank arm extends when the pedal is just past top dead centre and then starts to retract after the pedal has traveled approximately 90 degrees. This produces an elliptical pedal path (rather than the usual circular path).

In some embodiments it is possible to vary how much the crank arm extends by.

Direct power may be provided to the "upper section" (which carries the pedal) via the lower section by a flexible conduit, and from a power source (such as a battery, solar cell or the like) through a rotating connection.

Extension and contraction of the arm can be controlled by wired and/or wireless connections which give commands depending on where the two crank arms of a chainset are in the rotational path. A cam contact may, for example, be used to provide power.

In this embodiment the extension of the arm occurs faster than the retraction.

Figure 12:
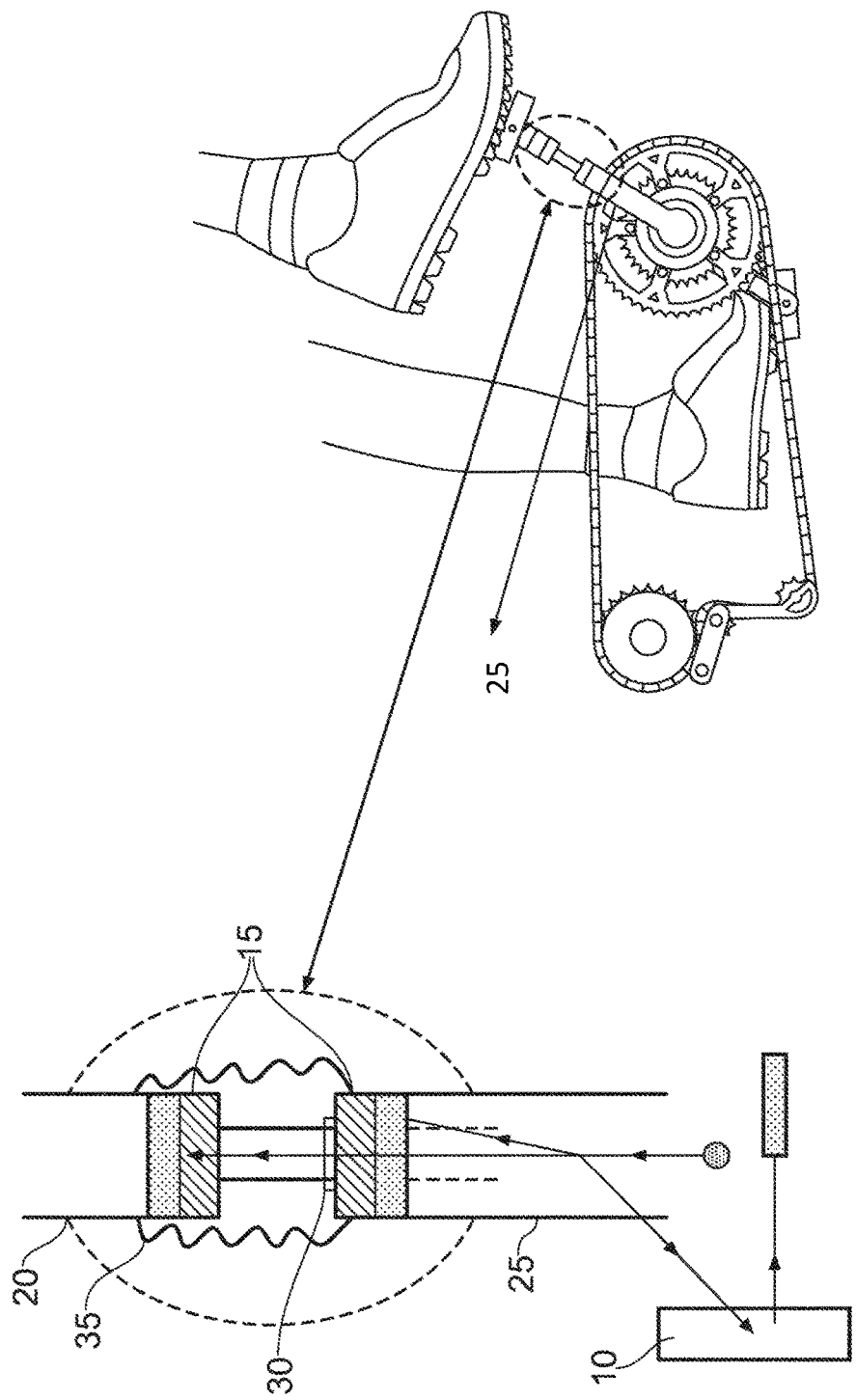
FIG. 12 shows a sliding bar PLC extension on the crank arm and its position in the chainset mechanism.

In FIG. 12 an example of a sliding bar reciprocating length crank arm is shown. A receiver/transmitter 10 is used to control energisation and de-energisation of electromagnets 15 to cause two sections 20, 25 of a crank arm to be attracted/repelled (depending on the polarity arrangement). In this embodiment washers or other elastomeric members 30 are provided to prevent the sections from crashing against each other. In addition, a concertina cuff 35 or the like is provided around the area between the sections.

Figure 13:
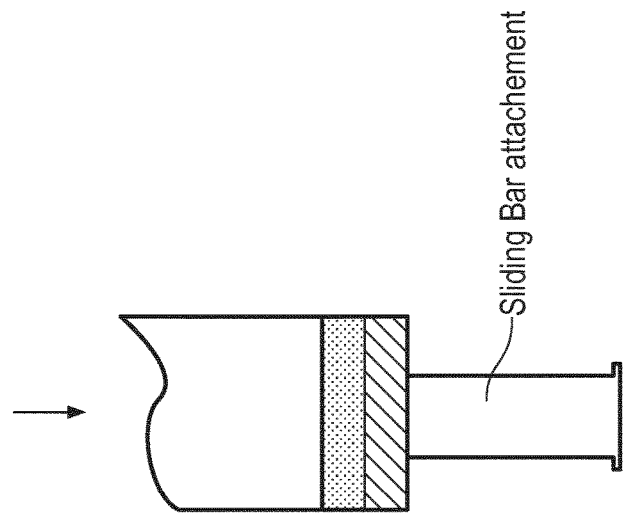
FIG. 13 shows a further embodiment of separable crank arm sections.
Figure 13:
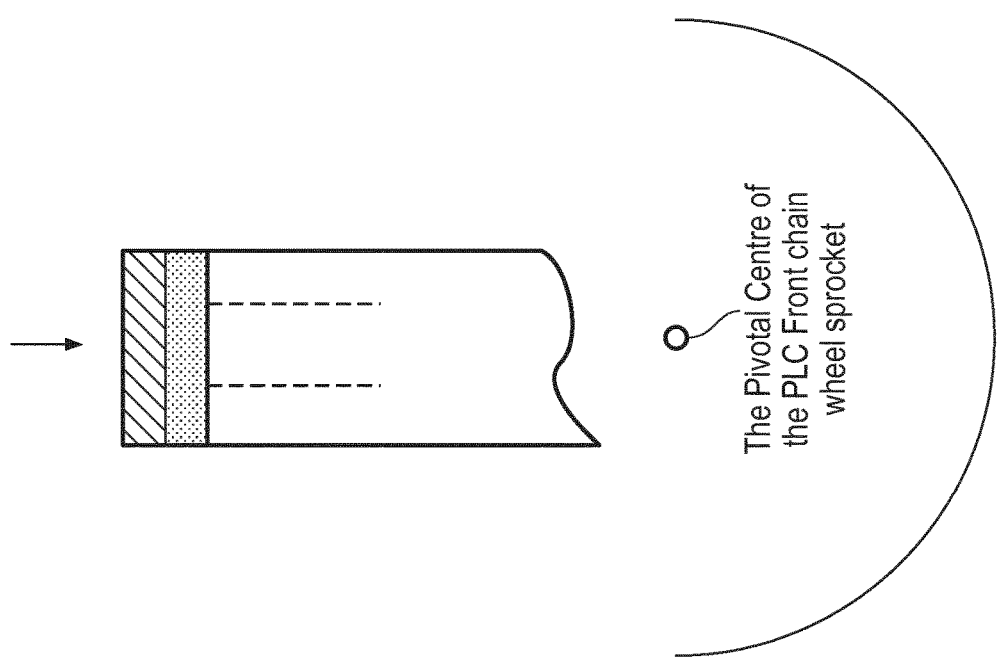

In FIG. 13 a further description of separable crank arm sections according to an embodiment of the present invention is given.

Although illustrative embodiments of the invention have been disclosed in detail herein, with reference to the accompanying drawings, it is understood that the invention is not limited to the precise embodiments shown and that various changes and modifications can be effected therein by one skilled in the art without departing from the scope of the invention as defined by the appended claims and their equivalents.

The invention claimed is:

1. A crank arm for a bicycle chainset, the arm having a varying crank length during rotation whereby to gain mechanical advantage, wherein the arm comprises an upper section and a lower section, said sections being movable relative to each other, said sections being connected by a sliding bar, said bar being fixed to said upper section, said lower section having a cavity for slidably receiving said bar, and a pair of magnets at least one of which is an electromagnet for attracting and/or repelling said upper and lower sections to/from each other using a change in polarity and/or creation of polarity in said at least one electromagnet to cause the variation in length of said arm.

2. The crank arm as claimed in claim 1, in which said crank length extends after the rotation passes top dead centre and retracts prior to bottom dead centre.

3. The crank arm as claimed in claim 1, in which the electromagnet is activated wirelessly.

4. The crank arm as claimed in claim 3, in which the electromagnet is activated by Wi-Fi.

5. The crank arm as claimed in claim 1, in which the amount the arm is extendible by is variable.

6. A bicycle foot pedal mechanism comprising two cranks, each crank carrying a pedal, each of the cranks comprising two sections movable relative to each other, said sections being connected by a sliding bar, said bar being fixed to one of said sections and the other of said sections having a cavity for slidably receiving said bar, and the cranks being automatically extendible and retractable dependent upon rotation extent to cause variation in length during rotation whereby to gain a mechanical advantage; wherein the sections of each crank abut one another when each crank is fully retracted.

7. A method of gaining mechanical advantage for a bicycle foot pedal mechanism, the method comprising: i) providing the bicycle foot pedal mechanism of claim 6; ii) monitoring the rotational extent of the pedals; iii) initiating extension of each crank when its respective pedal is passed top dead centre; and iv) initiating retraction of each crank before each crank reaches bottom dead centre.

8. The method as claimed in claim 7, in which step iii) is initiated when each respective pedal is passed top dead centre; and step iv) is initiated when each pedal has traveled approximately 90 degrees.

9. A method of gaining mechanical advantage for a bicycle foot pedal mechanism, the method comprising: i) providing the crank arm of claim 1, wherein said crank arm comprises a pedal; ii) monitoring the rotational extent of the pedal; iii) initiating extension of the crank arm when the pedal is passed top dead centre; and iv) initiating retraction of the crank arm before the arm reaches bottom dead centre.

* * * * *